US012588694B2

(12) United States Patent
Bapna et al.

(10) Patent No.: US 12,588,694 B2
(45) Date of Patent: Mar. 31, 2026

(54) PROCESS FOR AN INSTANT OIL FRIED NOODLE

(71) Applicant: SOCIETE DES PRODUITS NESTLE S.A., Vevey (CH)

(72) Inventors: Preksha Bapna, Gurgaon (IN); Michel Dreyer, New Delhi (IN); Michele Marazzato, Oberdiessbach (CH); Joan Federico, Kharkov (UA); Constantin Bertoli, Konolfingen (CH)

(73) Assignee: SOCIETE DES PRODUITS NESTLE S.A., Vevey (CH)

( * ) Notice: Subject to any disclaimer, the term of this patent is extended or adjusted under 35 U.S.C. 154(b) by 1120 days.

(21) Appl. No.: 17/421,427

(22) PCT Filed: Dec. 18, 2019

(86) PCT No.: PCT/EP2019/086075
§ 371 (c)(1),
(2) Date: Jul. 8, 2021

(87) PCT Pub. No.: WO2020/144032
PCT Pub. Date: Jul. 16, 2020

(65) Prior Publication Data
US 2022/0160001 A1　May 26, 2022

(30) Foreign Application Priority Data
Jan. 11, 2019　(IN) ............................. 201911001401
Feb. 18, 2019　(EP) ..................................... 19157622

(51) Int. Cl.
*A23L 7/113*　(2016.01)
*A23L 5/10*　(2016.01)

(52) U.S. Cl.
CPC ................. *A23L 7/113* (2016.08); *A23L 5/11* (2016.08)

(58) Field of Classification Search
CPC ............. A23L 7/113; A23L 5/11; A23L 7/109
USPC ........................................................ 426/618
See application file for complete search history.

(56) References Cited

U.S. PATENT DOCUMENTS

| | | | | |
|---|---|---|---|---|
| 5,955,623 | A | † | 9/1999 | Grant |
| 2002/0160093 | A1 | | 10/2002 | Sakai et al. |
| 2010/0055284 | A1 | | 3/2010 | Karwowski et al. |
| 2010/0323070 | A1 | | 12/2010 | Seto et al. |
| 2015/0007419 | A1 | † | 1/2015 | Liu |
| 2018/0338515 | A1 | | 11/2018 | Cheetham et al. |

FOREIGN PATENT DOCUMENTS

| | | | |
|---|---|---|---|
| CN | 1142910 | A | 2/1997 |
| CN | 104996911 | A | 10/2015 |
| EP | 0754409 | A2 † | 1/1997 |

| | | | |
|---|---|---|---|
| JP | 2005218441 | A | 8/2005 |
| JP | 2006262896 | A | 10/2006 |
| JP | 2016140260 | A | 8/2016 |
| JP | 2018130119 | A | 8/2018 |
| KR | 101237897 | | 3/2013 |
| NZ | 555574 | | 9/2008 |
| TW | 201238499 | | 10/2012 |
| WO | 0048476 | A1 | 8/2000 |
| WO | 2011078788 | | 6/2011 |
| WO | 2018005480 | | 1/2018 |

OTHER PUBLICATIONS

European Office Action for Appl No. 19 821 092.4-1105 dated Jun. 15, 2023.
Matthaus et al., "Some Rape/Canola Seed Oils: Fatty Acid Composition and Tocopherols", The Journal of Natural Research C, vol. 71 (3-4), 2016, pp. 73-77.
Gulia et al., "Instant Noodles: Processing, Quality and Nutritional Aspects", Critical Reviews in Food Science and Nutrition, vol. 54, Issue No. 10, 2013, pp. 1-44.
Smith et al., "Oxidative and Thermal Stabilities of Genetically Modified High Oleic Sunflower Oil", Food Chemistry, vol. 102, Dec. 31, 2007, pp. 1208-1213.
Aladedunyea et al., "Frying Stability of High Oleic Sunflower Oils as Affected by Composition of Tocopherol Isomers and Linoleic Acid Content", Food Chemistry, vol. 141, Dec. 31, 2013, pp. 2373-2378.
Chinese Office Action for Appl No. 201980086293.0 dated Dec. 26, 2023.
Ali et al., "Effect of Heating at Frying Temperature on the Quality Characteristics of Regular and High-oleic Acid Sunflower Oils", Acta Scientiarum Polonorum Food Technology, vol. 12, Issue No. 02, 2013, pp. 159-167.
Roszkowska et al., "Variation in the Composition and Oxidative Stability of Commercial Rapeseed Oils During Their Shelf Life", European Journal of Lipid Science and Technology, vol. 117, Issue No. 05, 2015, pp. 673-683.
Boskou et al., "Olive Oil Composition", Chapter 4, Olive Oil (Second Edition), Chemistry and Technology, 2006, pp. 41-72.
Smith, S.A. et al., Oxidative and thermal stabilities of genetically modified high oleic sunflower oil, Food Chemistry 102 (2007), pp. 1208-1213. Available online Sep. 11, 2006.†
Aladedunye, F. et al., Frying stability of high oleic sunflower oils as affected by composition of tocopherol isomers and linoleic acid content, Food Chemistry 141 (2013), pp. 2373-2378. Available online May 24, 2013.†
Petersen, K.F. et al., Chemical and sensory assessment of deep-frying oil alternatives for the processing of French fries, European Journal of Lipid Science Technology 2013, 115, pp. 935-945. Published Apr. 26, 2013.†

(Continued)

*Primary Examiner* — Subbalakshmi Prakash
(74) *Attorney, Agent, or Firm* — Calfee, Halter & Griswold LLP

(57) ABSTRACT

The present invention relates to a process for the production of an instant oil fried noodle. The oil used for frying the instant noodle comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat).

11 Claims, No Drawings

(56)           References Cited

OTHER PUBLICATIONS

Products from GNPD created by Mintel Group Ltd. (MINTEL) in 2023 using the Global New Product Database (GNPD), including noodle products published between Jan. 2015 and Dec. 2018, 33 pages.†
Products from GNPD created by MINTEL in 2023 using the GNPD, including products other than noodle products, published between Jan. 2015 and Dec. 2018, 32 pages.†

† cited by third party

PROCESS FOR AN INSTANT OIL FRIED NOODLE

CROSS REFERENCE TO RELATED APPLICATIONS

The present application is a National Stage of International Application No. PCT/EP2019/086075, filed on Dec. 18, 2019. which claims priority to Indian Patent Application number 201911001401, filed on Jan. 11, 2019 and European Patent Application No. 19157622.2, filed on Feb. 18, 2019, the entire contents of which are being incorporated herein by reference.

The present invention relates to a process for the production of an instant oil fried noodle. The oil used for frying the instant noodle comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat).

It is already known to have an instant oil fried noddle. The noodles are fried in palm oil due its low cost, ease of availability and high oxidative stability. Consumers are increasingly becoming sensitive to palm oil or palm fat concerns. Many of them perceive palm fat as not healthy due to high amounts of saturated fatty acids (SFA) and many others perceive it as not environmentally sustainable as a lot of news mention that the rain forest is destroyed to grow palm trees.

Therefore in order to provide nutritional benefits, reduction of total fat and/or SFA content in the product is of considerable importance. It is hence essential to explore other vegetable oils for frying of noodles which are not only economical to produce and easy to handle but are also stable for frying purposes. It should make noodles healthier without compromising on the sensory attributes, and overall quality of the product. In addition it should also have lower values of process contaminants formed during refining of oils, i.e. glycidyl fatty acid esters (GE)<1 ppm (preferably <0.5 ppm) and 3-MCPD<3 ppm

SUMMARY OF THE INVENTION

The object of the present invention is to improve the state of the art and to provide an improved or at least an alternative solution to overcome at least some of the inconveniences described above. The object of the present invention is achieved by the subject matter of the independent claims. The dependent claims further develop the idea of the present invention.

Particularly, the object of the present invention is to provide a process for the production of an instant fried noodle with a healthier perceived oil having good oxidation stability, low amounts of glycidyl fatty acid esters (<1 ppm, preferably <0.5 ppm) and 3-MCPD (<3 ppm), good sensory attributes and a shelf life of at least 9 months of the product.

Accordingly, the present invention provides in a first aspect a process for the production of an instant fried noodle comprising flour, Kansui salts, oil and optionally wheat gluten, the process comprising the steps of:

a) Mixing the flour and optionally other dry ingredients with the Kansui salts and water to form an uniform dough;

b) Sheeting and slitting the dough to obtain noodle strands;

c) Steaming the noodle strands from step b);

d) Optionally seasoning e) Cutting and folding the noodle strands from steps c) or d)

f) Optionally pre-drying to remove moisture before frying g) Frying in the oil;

h) Cooling.

wherein the oil comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat).

In a second aspect the invention relates to an instant fried noodle comprising flour, Kansui salts, oil, and optionally wheat gluten, wherein the fried noodle has an amount of oleic acid of at least 6 wt % (by weight of the total composition).

It has been surprisingly found by the inventors that by using an oil for frying the instant noodle, wherein the oil comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat), a healthier perceived oil having good oxidation stability, low amounts of glycidyl fatty acid esters (<1 ppm), low amounts of 3-MCPD (<3 ppm), as well as good sensory attributes and a shelf-life of at least 9 months of the product can be achieved. In addition as the oil is liquid at room temperature (20° C.) and therefore an easier dosing within the process is achieved compared to a solid palm fat, which needs to be melted first.

DETAILED DESCRIPTION OF THE INVENTION

In a first aspect the present invention pertains to a process for the production of an instant fried noodle comprising flour, Kansui salts, oil and optionally wheat gluten, the process comprising the steps of:

a) Mixing the flour and optionally other dry ingredients with the Kansui salts and water to form an uniform dough;

b) Sheeting and slitting the dough to obtain noodle strands;

c) Steaming the noodle strands from step b);

d) Optionally seasoning e) Cutting and folding the noodle strands from steps c) or d)

f) Optionally pre-drying to remove moisture before frying g) Frying in the oil;

h) Cooling.

wherein the oil comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat).

In a first aspect the present invention pertains to a process for the production of an instant fried noodle comprising flour, Kansui salts, oil and optionally wheat gluten, the process comprising the steps of:

a) Mixing the flour and optionally other dry ingredients with the Kansui salts and water to form an uniform dough;

b) Sheeting and slitting the dough to obtain noodle strands;

c) Steaming the noodle strands from step b);

d) Optionally seasoning e) Cutting and folding the noodle strands from steps c) or d)

f) Optionally pre-drying to remove moisture before frying g) Frying in the oil;

h) Cooling.

wherein the oil comprises the fatty acids C16:0 in the range of 1 to 10 wt % (based on weight of total fat) and C18:1 in the range of 75 to 90 wt % (based on weight of total fat) and C18:2 in the range of 0.5 to 10 wt % (based on weight of total fat).

In a preferred aspect the present invention pertains to a process for the production of an instant fried noodle comprising 45 to 80 wt % of flour (by weight of the total composition), 0.2 to 3.5 wt % of Kansui salts (by weight of the total composition), 0 to 7 wt % of wheat gluten (by weight of the total composition), 0 to 20 wt % of starch (by weight of the total composition) and 10 to 30 wt % of oil (by weight of the total composition), the process comprising the steps of:

a) Mixing the flour and optionally other dry ingredients with the Kansui salts and water to form an uniform dough;

b) Sheeting and slitting the dough to obtain noodle strands;

c) Steaming the noodle strands from step b);

d) Optionally seasoning e) Cutting and folding the noodle strands from steps c) or d)

f) Optionally pre-drying to remove moisture before frying g) Oil frying;

h) Cooling.

wherein the oil comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat).

In a preferred aspect the present invention pertains to a process for the production of an instant fried noodle comprising 45 to 80 wt % of flour (by weight of the total composition), 0.2 to 3.5 wt % of Kansui salts (by weight of the total composition), 0 to 7 wt % of wheat gluten (by weight of the total composition), 0 to 20 wt % of starch (by weight of the total composition) and 10 to 30 wt % of oil (by weight of the total composition), the process comprising the steps of:

a) Mixing the flour and optionally other dry ingredients with the Kansui salts and water to form an uniform dough;

b) Sheeting and slitting the dough to obtain noodle strands;

c) Steaming the noodle strands from step b);

d) Optionally seasoning e) Cutting and folding the noodle strands from steps c) or d)

f) Optionally pre-drying to remove moisture before frying g) Oil frying;

h) Cooling.

wherein the oil comprises the fatty acids C16:0 in the range of 1 to 10 wt % (based on weight of total fat) and C18:1 in the range of 75 to 90 wt % (based on weight of total fat) and C18:2 in the range of 0.5 to 10 wt % (based on weight of total fat).

In a second aspect the invention relates to an instant fried noodle comprising flour, Kansui salts, oil, and optionally wheat gluten, wherein the fried noodle has an amount of oleic acid of at least 6 wt % (by weight of the total composition).

In a preferred aspect the invention relates to an instant fried noodle comprising 45 to 80 wt % of flour (by weight of the total composition), 0.2 to 3.5 wt % of Kansui salts (by weight of the total composition), 0 to 7 wt % of wheat gluten (by weight of the total composition) and 10 to 30 wt % of oil (by weight of the total composition), wherein the fried noodle has an amount of oleic acid of at least 6 wt % (by weight on the total composition).

In a preferred aspect the invention relates to an instant fried noodle comprising 45 to 80 wt % of flour (by weight of the total composition), 0.2 to 3.5 wt % of Kansui salts (by weight of the total composition), 0 to 7 wt % of wheat gluten (by weight of the total composition) and 10 to 30 wt % of oil (by weight of the total composition), wherein the fried noodle has an amount of oleic acid in the range of 8 to 22 wt % (by weight of the total composition).

In a preferred aspect of the invention, there is provided a product obtainable by the process of the invention. All combinations should be considered.

The term "flour" according to this invention means at least one ingredient of wheat flour, oat flour, corn flour, rice flour, barley flour, millet flour or combinations thereof, preferably wheat flour. The flour has a particle size of 50 to 400 μm. A finer particle size could mean a high chance of starch to be damaged in the flour leading to higher water absorption. The dough would become sticky and causes operation issues. In addition noodle would turns sticky, starchy and non-elastic. A flour with a large particle size, on the other hand, needs longer water absorption time and often forms large dough lumps. In an embodiment the flour is standard refined wheat flour. In an embodiment the instant fried noodle comprises 45 to 80 wt % of flour (by weight of the total composition), preferable 48 to 80 wt %, preferably 50 to 75 wt %, preferably 52 to 72 wt % (by weight of the total composition).

The term "kansui salts" comprises a mixture of alkaline salts comprising sodium chloride, sodium carbonate, potassium carbonate and sodium phosphate. In an embodiment the instant fried noodle comprises 0.2 to 3.5 wt % of kansui salts (by weight of the total composition). In a preferred embodiment the kansui salts are dissolved in water to obtain a kansui solution. The term "kansui solution" comprises a mixture of 1 to 15 wt % of alkaline salts comprising sodium chloride, sodium carbonate, potassium carbonate and sodium phosphate (based on the total amount of the solution) in 85 to 99 wt % of water (based on the total amount of the solution), preferably the kansui solution comprises 3 to 7 wt % of alkaline salts and 93 to 97 wt % of water (based on the total amount of the solution).

The term "oil" according to this invention comprises the fatty acids C16:0 in the range of 1 to 25 wt % (based on weight of total fat) and C18:1 in the range of 60 to 90 wt % (based on weight of total fat) and C18:2 in the range of 0.1 to 20 wt % (based on weight of total fat) is a high oleic sunflower oil. In an embodiment the oil comprises C16:0. C16:0 is palmitic acid. In a further embodiment C16:0 is in the range of 1 to 25 wt % (based on weight of total fat), preferably C16:0 is in the range of 1 to 20 wt % (based on weight of total fat), preferably C16:0 is in the range of 1 to 15 wt % (based on weight of total fat), preferably C16:0 is in the range of 1 to 10 wt % (based on weight of total fat), more preferably C16:0 is in the range of 2 to 7 wt % (based on weight of total fat). In an embodiment the oil comprises C18:1. C18:1 is oleic acid. In a further embodiment C18:1 is in the range of 60 to 90 wt % (based on weight of total fat), preferably C18:1 is in the range of 65 to 90 wt % (based on weight of total fat), preferably C18:1 is in the range of 70 to 90 wt % (based on weight of total fat), preferably C18:1 is in the range of 75 to 90 wt % (based on weight of total fat), more preferably C18:1 is in the range of 80 to 90 wt % (based on weight of total fat). In an embodiment the oil comprises C18:2. C18:2 is linoleic acid. In a further embodiment C18:2 is in the range of 0.1 to 20 wt % (based on weight of total fat), preferably C18:2 is in the range of 0.1 to 15 wt % (based on weight of total fat), preferably C18:2 is in the range of 0.1 to 10 wt % (based on weight of total fat), preferably C18:2 is in the range of 0.5 to 10 wt % (based on weight of total fat), more preferably C18:2 is in the range of 0.5 to 5 wt % (based on weight of total fat). In an embodiment the oil of this invention has a melting point of −1 to +5° C. and relative density of 0.91. It is preferred that the oil is liquid at room temperature (20° C.) to avoid unnecessary heating during storage and transfer of oil into the process, higher storage temperature of oil would already lead to oxidation of oil. Standard commercial available sunflower oil (see comp. example 3) comprising the fatty acids C16:0 in the range of 5 to 8 wt % (based on weight of total fat) and C18:1 in the range of 14 to 40 wt % (based on weight of total fat) and C18:2 in the range of 48 to 74 wt % (based on weight of total fat). Standard commercial available palm oil (see comp. example 2) comprising the fatty acids C16:0 in the range of 39 to 47 wt % (based on weight of total fat) and C18:1 in the range of 36 to 44 wt % (based on weight of total fat) and C18:2 in the range of 9 to 12 wt % (based on weight of total fat). In an embodiment the standard palm oil has a slip melting point between 30 to 50° C. and is solid at room temperature (20° C.)

The dough mixing time is between 10 to 40 minutes, preferably 15 to 30 minutes. A twin speed mixer is used. The mixing speed is between 50 to 120 rpm. High speed mixing (between 100 to 120 rpm) is recommended during the time the kansui solution is dosed to avoid localized dosing and to ensure homogeneity. For addition of small ingredients like calcium carbonate, fortificant (vitamin and/or mineral) it is recommended to make a pre-blend with flour before addition. The amount of water added has a big influence on dough formation. The moisture content of the dough after mixing should be between 20 to 40%, preferably between 25 to 35%. If too much water is added the dough will be too soft and sticky. If too less water is added the noodle will be brittle, doughy and hard-centered due to insufficient gelatinisation during steaming as degree of gelatinisation depends on moisture content of dough.

The term "sheeting" is a process step wherein the dough is passed through a series of rollers to obtain a final sheet of desired thickness which will then determine the noodle strand thickness. By sheeting the dough a network is developed as pressure is applied. In addition the sheeting removes entrapped air from the dough and therefore reduces porosity and result in less oil uptake.

The slitter/cutter called "kiriha" consists of a pair of grooved cylinders which cut and separate the dough sheet into strands that are trapped in the grooves. These strands are immediately removed by a comb-like scraper, called "kasuri" which is attached in between the two rollers. The width of the noodle strand is determined by Kiriha groove width.

The purpose of steaming is to gelatinize the starch in order to eliminate the raw and doughy taste on the end-product. Steaming time and temperature along with steam pressure affect product quality and are known to the person skilled in the art. Good steaming results to obtain at least 80% starch gelatinisation is giving a better association of starch granules and protein matrix as well as better continuity of protein network. The steaming time is between 0.5 to 15 minutes, preferably 0.5 to 7 minutes. A saturated steam is used. If steaming is insufficient, the final noodle will have a gritty center, doughy and raw wheat after taste (cereal note). Noodle strands coming out of the steamer are hot and tend to stick to the steamer mesh conveyor. This can lead to poor cutting and folding down the line. Therefore, the strands are cooled and slightly dried up using fans or blowers/air knives at the exit of steamer tunnel.

Seasoning means that flavor or flavors are added by a spraying or within a seasoning bath.

Pre-drying is used to reduce the wet cake moisture content by 2 to 10%. In addition after pre-drying an oil up take reduction by 1 to 8%, preferably 2 to 4% is achieved. A pre-drying step is done at a temperature between 50 to 120° C. within 15 to 500 sec, preferably at a temperature between 60 to 100° C. within 30 to 400 sec. In a preferred embodiment the noodles are pre-dried.

Frying is a process wherein moisture from cakes is removed to a desired level and doughy taste is eliminated in the end product. Steamed or pre-dried noodle cakes are conveyed to the fryer buckets which pass through the hot oil bath. The Frying in oil is done at temperatures between 110 to 170° C. and a frying time between 30 to 200 seconds, preferably at temperatures between 130 to 165° C. and a frying time between 40 to 150 seconds. After oil frying the final moisture in the product is less than 10 wt %, preferably between 2 to 10 wt % (by weight of the total composition). The final product has a water activity<0.6.

In an embodiment the instant fried noodle has an amount of oil in the range of 10 to 30 wt % (by weight of the total composition), preferably between 12 to 28 wt %, preferably between 13 to 25 wt %, preferably between 13 to 19 wt % (by weight of the total composition).

Cooling means that the temperature of the noodle after frying in the oil is reduced. It is desirable to have the noodle cake temperature the same as or close to room temperature before wrapping, preferably between 20 to 30° C., more preferably between 20 to 25° C. Otherwise, there may be condensation of water vapour in the packet of noodles, which may lead to mould growth. A side from condensates, hot cakes also cause expansion of air within the pack, subsequently causing difficulty in secondary packaging.

Those skilled in the art will understand that they can freely combine all features of the present invention disclosed herein. In particular, features described for different embodiments of the present invention may be combined. Where known equivalents exist to specific features, such equivalents are incorporated as if specifically referred to in this specification.

EXAMPLES

Example 1

Process

Standard Fried Instant noodle manufacturing process involves mixing of flour (wheat flour) and kansui solution in a batch mixer. Noodle line used for the production is from CCK supplier. Dough from mixer is passed through rollers to form two sheets thereafter compounding the two dough sheets into one, reducing dough sheet to a desired thickness through a series of rollers. The final sheet is passed through the kiriha to slit the dough sheet and form the noodle strands, which are then steamed in a tunnel.

The steamed noodles are cut, folded and moulded into pre-dryer. The pre-dryer removes moisture before frying and helps to reduce the oil uptake. The pre-dried noodle cakes are discharged from pre-dryer to frying bucket, which are then passed through a fryer where noodle cakes are fried and moisture is removed. After which, the cakes are cooled to ambient temperature before packing. The cakes are then packed in a bag form with single or multiple sachets of tastemaker.

Below table shows details of all the process steps with the process parameters:

| Process Steps | Process Parameters | Moisture |
|---|---|---|
| Mixing | High Speed: 90 Hz, 1 min Dry Mixing | 30-31% |
| | High Speed: 90 Hz, 4 min Kansui Dosing | |
| | Low Speed: 50 Hz, 16 minute for gluten development | |
| Sheeting & Slitting | Final Sheet Thickness: 0.9 mm, Kiriha K 30 | |
| Steaming | Time: 130 s, Saturated Steam | 31-32% |
| Cut and Fold | Bag type | |
| Predrying | Temp: 80° C., Time: 225 s | 25-27% |
| Frying | Temp: 150° C., Time: 70 s, Oil Uptake: 18-19% | 2-6% |
| Cooling | Ambient temperature and Packaging | 2-6% |

Water Activity Measurement

Water activity is measured with AquaLab instruments 4TE and 4TEV connected to PC with Aqualink 4.0 software. Measurement is carried out at 25.0±0.5° C. according to validated on the official AOAC method 978.18

Peroxide Value (PV) Measurement

Peroxide Value (PV) in the samples is analyzed as per internal LI based on AOCS method Cd 8b-90 and can be applied to animal and vegetable oils and fats. It is the quantity of all the substances in terms of mill equivalents of peroxides per 1000 grams of sample that oxidize potassium iodide under the operating conditions. These substances are generally assumed to be peroxides or other similar products of fat oxidation.

Total Polar Material (TPM) Measurement

TPM is measured using rapid method with hand-held probe (Testo 270) which is based on principal of capacitive measurement. This is validated with standard method, ISO 8420. TPM gives the value of total polar compounds in oil generated during frying process.

Free Fatty Acid Measurement

Free Fatty Acids (FFA) in the samples was analysed as per LI 03.516-3. This method corresponds to the International standard method ISO 660:2008—Animal and vegetable fats and oils-Determination of acid value and acidity with minor modifications. It is applicable to edible oils and fats, and the extracted fat. FFA's are generally formed due to the presence of moisture in the foods exposed to oil. The present method determines the amount of these FFA's formed by titration against a base, and generally expressed as percent oleic acid, unless otherwise stated.

Examples 2-5

Examples 2 to 5 are prepared according to example 1. Comparison example 2 use palm oil and example 3 use standard sunflower oil for frying.

| | Comp. Ex 2 | Comp. Ex 3 | Ex. 4 | Ex. 5 |
|---|---|---|---|---|
| Noddle dough composition | | | | |
| Wheat flour | 77 | 77 | 77 | 77 |
| Kansui | 22 | 22 | 22 | 22 |
| Wheat gluten | 1 | 1 | 1 | 1 |
| Oil used for oil frying | Palm oil | Sunflower oil | HOSO | UHOSO |
| Oil in final instant noodle | 16% | 17% | 17% | 16% |
| Moisture in final instant noodle | 3.0% | 4.0% | 3.6% | 3.2% |
| Water Activity in final instant noodle | 0.1 | 0.2 | 0.2 | 0.2 |
| Oil composition | | | | |
| C16:0 | 43 | 6 | 4 | 3 |
| C18:0 | 4 | 3 | 3 | 2 |
| C18:1 | 39 | 28 | 83 | 87 |
| C18:2 | 10 | 59 | 8 | 4 |
| Free Fatty Acid-Fresh Oil | 0.07 | 0.07 | 0.03 | 0.07 |
| TPM-Fresh Oil | 8.0% | 8.5% | 2.5% | 1.5% |
| Glycidyl fatty acid esters (ppm-Fresh Oil) | 0.94 | 0.33 | 0.40 | 0.21 |
| FFA (12 hrs Frying) | 0.22 | 0.16 | 0.12 | 0.13 |
| TPM (12 hrs Frying) | 12% | 14% | 5.5% | 6.0% |
| Shelf-life | 9 months | 6 months | 9 months | 9 months |
| *Sensory data-Off note evaluation by panel | Less than 1 on scale of 5 | More than 4 on scale of 5 | Less than 1 on scale of 5 | Less than 1 on scale of 5 |

*0-No off note, 5-Very high off notes (Flavor and Aroma); 20 panellists tested.

It is shown that by using an oil of the invention for frying the noodles the lowest values for free acids (FFA), total polar material (TPM) and glycidyl fatty esters are achieved. In addition within examples 4 to 5 it is shown that a shelf-stable product can be obtained having good sensory data and a lower amount of TPM.

Example 6

Without Pre-Drying Step

Examples 6 is prepared according to example 1 except the process step of pre-drying. Without the pre-drying step the amount of moisture in the final product and the amount of oil is higher compared to a process having the pre-drying step.

|                            | Ex 6                        |
|----------------------------|-----------------------------|
| Wheat flour                | 77                          |
| Kansui                     | 22                          |
| Wheat gluten               | 1                           |
| Oil used for oil frying    | HOSO                        |
| Oil in final instant noodle| 23.6%                       |
| Moisture in final instant noodle | 3.8%                  |
| Water Activity             | 0.2                         |
| Shelf-life                 | 3 month ART/ 9 months NRT   |

Example 7

Examples 6 is prepared according to example 1. Within example 7 no wheat gluten is within the composition of the noodle.

|                            | Ex 7     |
|----------------------------|----------|
| Wheat flour                | 77       |
| Kansui                     | 23       |
| Wheat gluten               | 0        |
| Oil used for oil frying    | HOSO     |
| Oil in final instant noodle| 15.3%    |
| Moisture in final instant noodle | 3.5% |
| Water Activity             | 0.2      |

The invention claimed is:

1. A process for production of an instant fried noodle comprising flour, Kansui salts, and oil, the process comprising:

a) Mixing the flour and other dry ingredients with a Kansui solution to form a uniform dough, wherein the Kansui solution has 3 to 7 wt % of alkaline salts selected from the group consisting of sodium carbonate, potassium carbonate and sodium phosphate, based on the total amount of the Kansui solution;

b) Sheeting and slitting the dough to obtain noodle strands;

c) Steaming the noodle strands from step b);

d) Cutting and folding the noodle strands;

e) Frying the noodle strands in the oil; and f) Cooling the noodle strands;

wherein the oil is a high oleic sunflower oil comprising the fatty acids C16:0 in the range of 1 to 25 wt % based on weight of total fat, C18:1 in the range of 60 to 90 wt % based on weight of total fat and C18:2 in the range of 0.5 to 5 wt % based on weight of total fat.

2. The process of claim 1, wherein the flour is at least one of wheat flour, oat flour, corn flour, rice flour, barley flour, millet flour and combinations thereof.

3. The process of claim 1, wherein the weight of the flour is in the range of 47 to 80 wt % of the instant fried noodle.

4. The process of claim 1, wherein the oil comprises the fatty acids C16:0 in the range of 1 to 15 wt % based on weight of total fat, C18:1 in the range of 75 to 90 wt % based on weight of total fat.

5. The process of claim 1, wherein the weight of the oil is in the range of 10 to 30 wt % of the instant fried noodle.

6. The process of claim 1, wherein the temperature of the oil for the frying the noodle strands is between 110 to 170° C. and a frying time between 30 to 200 seconds.

7. The process of claim 1, wherein the steaming comprises using saturated steam within 0.5 to 15 minutes.

8. The process of claim 1, comprising pre-drying the noodle strands from step d) at a temperature between 50 to 120° C. and 15 to 500 seconds.

9. An instant fried noodle produced according to the process of claim 1, wherein the fried noodle has an amount of oleic acid in the range of 6 to 11 wt % of the instant fried noodle.

10. The instant fried noodle of claim 9, wherein the fried noodle has an amount of the oleic acid in the range of 8 to 11 wt % of the instant fried noodle.

11. The instant fried noodle as claimed in claim 9, wherein the fried noodle comprising 45 to 80 wt % of the flour of the instant fried noodle, 0 to 7 wt % of the wheat gluten of the instant fried noodle and 10 to 11 wt % of the high oleic sunflower oil of the instant fried noodle.

* * * * *